United States Patent
Caradec et al.

(10) Patent No.: US 9,172,992 B2
(45) Date of Patent: Oct. 27, 2015

(54) REMOTE DEVICE ACCESS

(75) Inventors: Jean-Philippe Caradec, Meylan (FR); Bernt Kristiansen, Grenoble (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 2960 days.

(21) Appl. No.: 11/490,517

(22) Filed: Jul. 19, 2006

(65) Prior Publication Data

US 2007/0070404 A1    Mar. 29, 2007

(30) Foreign Application Priority Data

Sep. 29, 2005 (EP) .................................... 05300785

(51) Int. Cl.
  *G06F 3/12* (2006.01)
  *H04N 21/436* (2011.01)
  *H04N 21/4402* (2011.01)
  *H04N 7/12* (2006.01)

(52) U.S. Cl.
  CPC ..... *H04N 21/43615* (2013.01); *H04N 21/4402* (2013.01)

(58) Field of Classification Search
  None
  See application file for complete search history.

(56) References Cited

U.S. PATENT DOCUMENTS

| | | | |
|---|---|---|---|
| 4,665,501 A * | 5/1987 | Saldin et al. ...................... 710/8 |
| 6,275,537 B1 * | 8/2001 | Lee .......................... 375/240.28 |
| 2001/0005385 A1 * | 6/2001 | Ichiguchi et al. ............. 370/535 |
| 2004/0068744 A1 * | 4/2004 | Claussen et al. ................ 725/81 |
| 2004/0170379 A1 * | 9/2004 | Yao et al. ......................... 386/46 |
| 2004/0227811 A1 * | 11/2004 | Yoneda ..................... 348/14.08 |
| 2005/0132405 A1 * | 6/2005 | AbiEzzi et al. ................. 725/61 |
| 2006/0129669 A1 * | 6/2006 | Kojima ........................ 709/223 |

FOREIGN PATENT DOCUMENTS

| | | |
|---|---|---|
| GB | 2 410 160 A | 7/2005 |
| WO | 2004/068744 A1 | 4/2004 |

* cited by examiner

*Primary Examiner* — Mohammad Ghayour
*Assistant Examiner* — Pawandeep Dhingra
(74) *Attorney, Agent, or Firm* — Hewlett-Packard Patent Department

(57) ABSTRACT

According to one aspect of the present invention, there is provided apparatus for accessing a remote source device, comprising a network interface for receiving a media stream from a remote media encoding device, the remote media encoding device generating the media stream from media signals generated by the remote source device, a media decoder for decoding the received media stream, and a user input device for generating signals in response to actuation of the use input device and for transmitting the generated signals to the media encoding device for delivery to the remote source device.

13 Claims, 3 Drawing Sheets

FIGURE 2
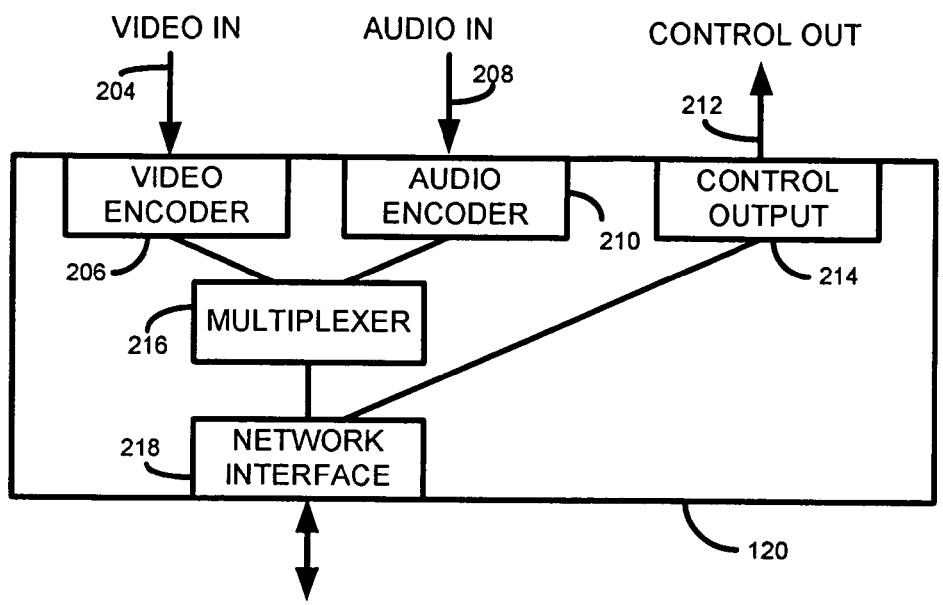
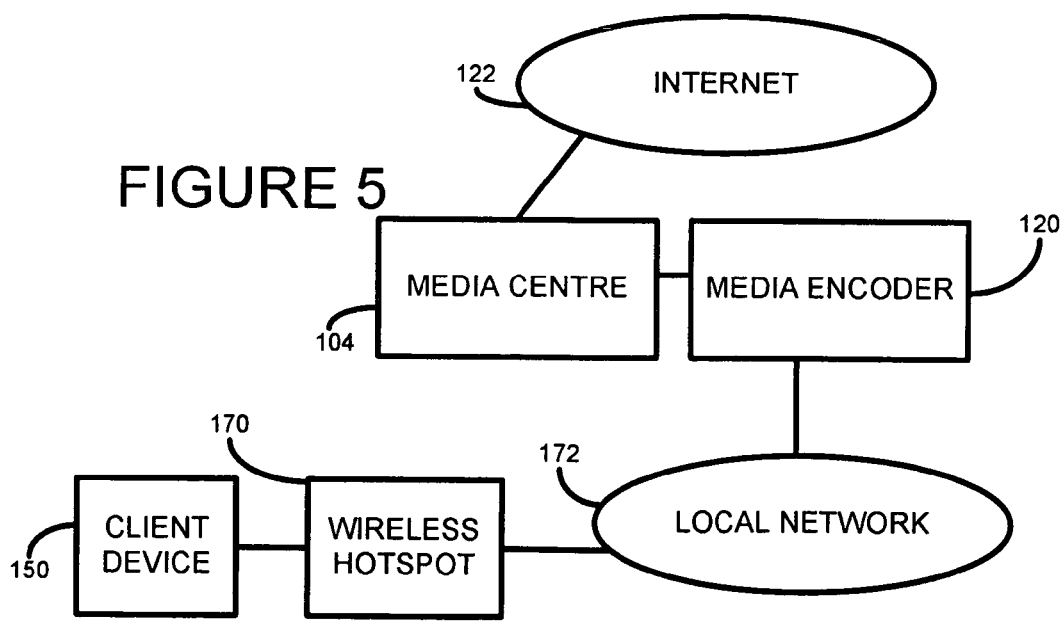
FIGURE 5

REMOTE DEVICE ACCESS

FIELD OF THE INVENTION

The present invention relates generally to the field of remote device access.

BACKGROUND OF THE INVENTION

Ever since the introduction of computing devices computing power has been increasing at a phenomenal rate. At the same time the complexity of computing devices, and the computer programs and applications running on computing devices, has also increased at an equally impressive rate.

A result of this seemingly endless progression is that the lifespan of a typically computer system may typically be no more than five years. One of the reasons for this is that, as the whole computer industry moves forward, computer hardware is becoming increasingly powerful and software developers are continually aiming to exploit the latest hardware with increasingly sophisticated computer software such as computer operating systems, computer applications, computer games, and the like. A result of this is that older computer software quickly becomes obsolete and unsupported, whereas newer computer software is unlikely to run satisfactorily, if at all, on older computer hardware. One consequence of this is that consumers are almost obliged to upgrade both their computer hardware and software systems on a regular basis.

Another downside of this constant evolution is that computer systems are generally becoming increasingly complex, and many users are struggling to understand how to operate their own personal computer systems.

Take, for example, an activity which is often taken for granted, such as browsing the Internet through an Internet browser.

Browsing the Internet involves a large number of separate components and considerations. For example, a user needs, amongst other things, a suitable computing device which has a visual display device, audio output capabilities, a user input device, adequate processing resources including a suitable microprocessor and adequate memory, network connectivity, a suitable operating system, and a suitable Internet browser application. If the device is going to be connected to the Internet the device may also require anti-virus software to prevent malicious programs being executed on the device and a firewall, to prevent unauthorized access to the device whilst connected to the Internet.

Typical Internet browsers are capable of viewing information content written in either hypertext mark-up language (HTML) or extensible mark-up language (xML)—the two main content formats designed for and by the Internet community. However in addition to HTML and xML there exists a proliferation of different, often proprietary, multimedia formats which are often used by web designers when designing web pages. Such formats include Shockwave, Macromedia Flash, MP3 audio, DivX video, Quicktime, Adobe Personal Document Format (PDF), Java, and so on. Since these formats are typically proprietary, and are generally not developed by the same companies which provide Internet browsers, they are not provided for in Internet browsers. Hence, in order to view a web page using one of these formats the consumer is required to find, download and install the specific proprietary applications (or plug-in) to enable the content to be viewed. The installation of such additional applications brings with it additional concerns, such as increased storage and memory requirements, additional processing requirements, compatibility issues with existing applications and hardware.

In addition to device related requirements, the installation of such applications is generally governed by a license agreement which the consumer has to read and agree to prior to installing the application. In some circumstances the consumer may be unwilling to accept the terms of the license agreement, and is thus unable to install the application, and hence is unable to view content provided for in that particular format.

Furthermore, due to the complex security and interoperability requirements, such devices typically require a degree of configuration and maintenance to be performed by the consumer, which in turn requires that the consumer has a reasonable degree of expertise regarding the device.

Still further, as consumer computing equipment becomes out-of-date consumers are required to regularly upgrade their existing computing equipment with evermore powerful and complex equipment.

The current situation is thus particularly confusing and inconvenient to many people, especially the majority of the general public who have little or no information technology skills.

What is required is a way to provide users with access to computing systems in a simple manner.

Accordingly, one aim of the present invention is to overcome, or at least to alleviate, at least some of the above-mentioned problems.

BRIEF SUMMARY OF THE INVENTION

According to one aspect of the present invention, there is provided apparatus for accessing a remote source device, comprising a network interface for receiving a media stream from a remote media encoding device, the remote media encoding device generating the media stream from media signals generated by the remote source device, a media decoder for decoding the received media stream, and a user input device for generating signals in response to actuation of the user input device and for transmitting the generated signals to the media encoding device for delivery to the remote source device.

Advantageously, such an apparatus enables a user to access a remote source device in a simple and safe manner. Furthermore, such an apparatus is substantially future-proof, in that the device does not need replacing or upgrading, even if remote source device evolves. Such an apparatus is low-cost compared to the cost of the computing systems to which it provides access, and requires the user to have little or no IT skills and is additionally substantially maintenance-free, requiring little or no configuration, upgrading, patching, and the like.

Suitably, the received media stream comprises multiplexed video and audio streams, and in which case the media decoder further comprises a demultiplexer for demultiplexing the video and audio streams.

Suitably the media decoder comprises a video decoder and an audio decoder for generating a video and audio output based on the received media stream.

Suitably the network interface is adapted to providing the remote media encoding device with details of technical characteristics of the apparatus, such technical characteristics including at least one of, video output capabilities, audio output capabilities, user input device characteristics and network characteristics.

Suitably the apparatus enables a user of the apparatus to operate the source device as if they were locally operating that source device.

Suitably, the user input device is adapted for transmitting the generated signals via the network interface.

According to a second aspect of the present invention, there is provided a media encoding device comprising a media encoder for generating a media stream by encoding media signals supplied by a source device, a network interface for transmitting the media stream to a remote device, and a control signal output module for receiving control signals from the remote device and for transmitting the control signals to the source device.

Suitably, the media signals comprise video and audio signals and the media encoder comprises a video encoder for encoding the video signals and an audio encoder for encoding the audio signals, and the media encoder further comprises a multiplexer for multiplexing the encoded video and audio signals to generate the encoded media stream.

Suitably, the network interface is arranged to obtain details of technical characteristics of the remote device, such technical characteristics including at least one of video output capabilities, audio output capabilities, user input device characteristics, network interface characteristics.

Suitably, the media encoding device enables a user of the remote device to operate the source device as if they were locally operating that source device.

Suitably, the control signal output module is adapted to convert received control signals into a format appropriate to control the source device.

Suitably, the media encoder is adapted to detect the type of media signals to be encoded and to configure the media encoder to encode the media signals in accordance with the detected type.

Suitably, the media encoding device is adapted to encode the media signals based on the obtained technical characteristics of the remote device.

Suitably, the media encoding device is adapted to be connected to a plurality of source devices, the media encoding device further comprising a source selection controller for enabling the user of the remote device to select from which source device media signals are to be encoded and received control signals to be sent to.

According to a third aspect of the present invention, there is provided a system comprising a thin-client device and a media encoding device as described above.

BRIEF DESCRIPTION OF THE DRAWINGS

An embodiment of the present invention will now be described, by way of example only, with reference to the accompanying diagrams, in which:

FIG. 2 is a block diagram of a media encoder according to an embodiment of the present invention;

FIG. 5 is a block diagram showing an overview of a system according to a further embodiment of the present invention.

DETAILED DESCRIPTION

Figure 1:
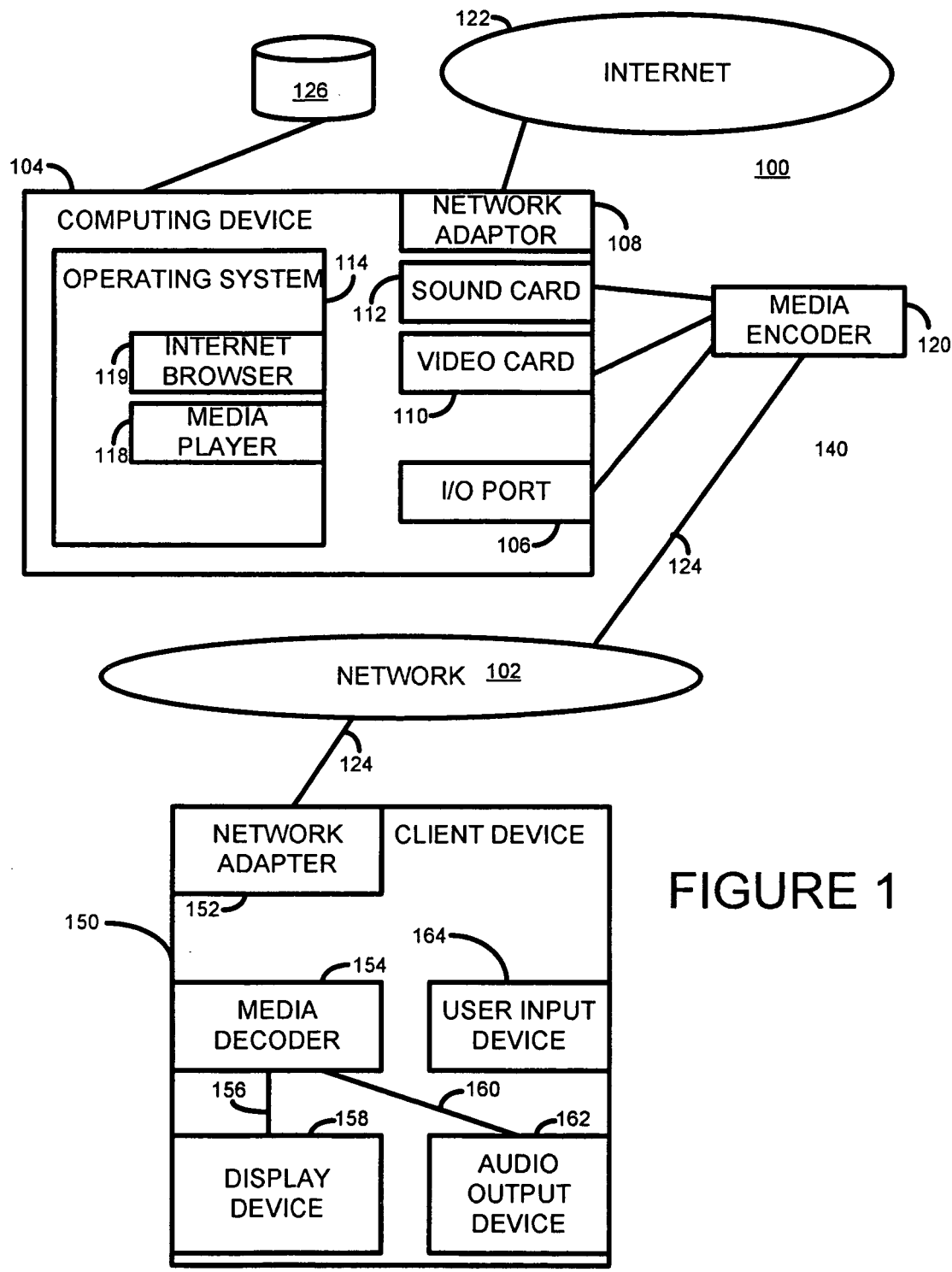
FIG. 1 is a block diagram of a system according to one embodiment of the present invention.

Referring now to FIG. 1 there is shown a block diagram of a system 100 according to one embodiment of the present invention. The system 100 comprises a server side, indicated generally at 140, a client side device 150, and a network 102 through which the client side device 150 communicates with the server side 140.

The server side 140 comprises primarily a computing device 104 which is remote from the client device 150 and a media encoder 120.

The computing device 104 is a general purpose computing device, such as a conventional computer server, capable of carrying out a range of different computing tasks. For clarity not all of the essential elements of the computing device 104 are shown or described herein. In the present example the computing device 104 includes a computer operating system 114 which is, for example, a multi-tasking operating system, such as Microsoft Corporation's Windows XP operating system, the LINUX operating system, or any other appropriate operating system. The operating system 114 executes a number of computer software applications including a media player application 118 and an Internet browser 119. A storage device 126 is provided, either internally or externally to the computing device for storing applications and data. A network adaptor 108 is provided for providing access to the Internet 122.

The computing device 104 includes a video generation card 110 for generating video output signals suitable for displaying visual information to a user of the device via a suitable display device such as a computer monitor. Similarly, the computing device 104 also includes a sound generation card 112 for generating audio signals suitable for outputting via a loudspeaker.

The computing device also includes an I/O port 106 through which a suitable user input device may be connected, such as a mouse, a keyboard, a joystick, or the like.

Whereas in a typical computer server the output of the video card 110 is connected to a suitable visual display device to display the video images generated by the computing device, in the present embodiment the output of the video card 110 is connected to a media encoder 120. Similarly the output of the sound card 112 is connected not to a loudspeaker, but is also connected to the media encoder 120. The I/O port 106 is likewise connected to the media encoder 120.

The media encoder 120 encodes the video and audio signals of the computing device 104 and generates an encoded multiplexed video and audio stream 124, referred to hereinafter as the media stream, which is transmitted to the client device 150. The media encoder 120 also receives user control signals from the client device 150 and sends them to the I/O port 106.

The client device 150 is a thin-client device which includes a network adaptor or interface 152 for receiving the media stream 124 and for passing the media stream 124 to a media decoder 154. The media decoder 154 demultiplexes the received media stream and extracts, where present, an encoded video and audio stream. The media decoder 154 decodes the demultiplexed video stream 124 and generates a reconstituted video signal 156 which it provides to a display device 158 such as a liquid crystal display (LCD) screen. The media decoder 154 also decodes, where present, the demultiplexed audio stream and generates a reconstituted audio signal 160 which it provides to an audio output device 162, such as a loudspeaker. Those skilled in the art will appreciate that the display device 158 and/or the audio output device 162 may be either internal to or external to the client device 150. For example, the audio output device 162 may provide audio signals enabling a pair of headphones to be connected to the client device. 150. Those skilled in the art will also appreciate that the media stream may alternatively contain either just a video stream or just an audio stream.

Thus the client device 150 outputs, in substantially real-time (subject to any encoding or network latency), the decoded audio and video streams generated by the media encoder 120 from the video and sound generation cards 110 and 112 of the computing device 104 thereby enabling the user of the client device 150 to visualize and hear and output generated by the computing device 104.

The client device 150 includes a user input device 164 such as a joystick, a mouse, a roller ball, a touch responsive input pad, a keyboard, one or more keys, buttons, or the like, for enabling the user of the client device 150 to interact with the computing device 104. Preferably the user input device 164 provides directional input and one or more buttons to effect a selection or input confirmation. As the user of the client device 150 manipulates the user input device 164 the user input device 164 generates appropriate user control signals and sends the user control signals, via network adaptor 152, to the media encoder 120 where they are appropriately formatted and output to the I/O port 106.

In this way the media encoder 120 enables the client device 150 to remotely access and control the computing device 104 from the client device 150, as is described in greater detail below.

Referring now to FIG. 2 the media encoder 120 is shown in more detail. The media encoder 120 comprises a video input 204 which provides input video signals to a video encoder 206. An audio input 208 provides input audio signals to an audio encoder 210. In the present example the output of the video card 110 of the computing device 104 is connected to the video input 204, and the output of the audio card 112 is connected to the audio input 208.

The video encoder 206 is preferably a low-bandwidth video compression encoder, such as an MPEG-4, H263, H264, or equivalent, compatible encoder. The video encoder 206 converts the output of the video generation card 110 into an encoded video stream. The audio encoder 210 is preferably a low-bandwidth audio compression encoder, such as MP3, AAC, or equivalent. The media encoder 120 further includes a multiplexer 216 for generating a single media stream comprising both compressed video and compressed audio.

Depending on the particular software application being executed by the computing device 104 the amount of new video information generated may vary considerably. For example, if the user of the client device 150 is remotely accessing the computing device 104 to play a chess game the amount of new video information generated is likely to be limited to each time a player makes a move. In between each move the video display is unlikely to be updated, apart from perhaps the user moving the pointer around the screen.

On the other hand, if the user of the client device 150 is remotely accessing the computing device 104 to watch a DVD movie the amount of new video information generated is much greater, for example 25 frames per second for PAL video, and 29.97 frames per second for NTSC video.

The video encoder 206 used by the media encoder 120 is preferably such that it produces a low-bit rate video stream whilst maintaining a high quality image. However, depending on the type or nature of the video input signal it may be preferable to use different encoding algorithms or parameters in order to maximize the quality of the video images displayed on the client device 150.

For example, if the user of the client device 150 is watching a full screen DVD film, a compression algorithm such as MPEG-4 could be used. However, if the user of the client device is browsing the Internet or reading a document a different compression algorithm or different encoding parameters which are better at rendering clear text may be used, as will be appreciated by those skilled in the art.

Preferably the video compression scheme used takes into account the resolution of the display device of the client device. For example, if the client device has a resolution half that of a standard PAL television, the video image may be suitably resized prior to being encoded. The video encoder 204 is therefore preferably operable to choose the best encoding algorithm or scheme to ensure that the video displayed on the display device 158 is of a suitable quality and at a suitable bandwidth. Similar considerations may apply for the audio encoder 210, for example if the client device only has a mono audio output the audio encoding can be performed in mono, whereas if the client device has a multi-channel sound-sound system, encoding of the audio can be tailored accordingly.

Since the media encoder 120 can handle substantially real-time compression of video images up to at least 30 frames per second, this means that the client device 150 can be used for accessing any type of computer application on the computing device 104, since the highest frame rate likely to be generated by the computing device 104 is when watching a full frame DVD quality movie. The client device 150 requires, therefore, only a suitable network bandwidth to cope with the maximum anticipated bandwidth of that required when watching a remote DVD quality movie, and a suitable media decoder 154.

The media stream output by the multiplexer 216 is fed to a network adaptor or interface 218 where the media stream is streamed to a client device, such as the client device 150, in the manner described above.

The network adaptor 218, which may be a fixed or wireless network adaptor, of the media encoder 120 receives user control signals from the client device 150 and sends these signals to a control output module 214 which formats the user control signals into an appropriate format. The formatted user control signals are output via a control output 212. If the media encoder 120 is connected to the I/O port 106, for example, control signals output by the media encoder preferably emulate control signals of an equivalent locally connected user input device, such as mouse, keyboard, etc.

For example, if the I/O port 106 of the media encoder 120 is a USB port, the computing device 104 preferably recognizes the media encoder as a USB device such as a mouse, joystick, keyboard etc. Preferably the media encoder is configured to know or to discover the type of user input device 164 of the client device 150. For example, if the user input device 164 is a keyboard, preferably the media encoder 120 appears as a keyboard to a personal computer to which it is connected.

In this case where the user input device is a mouse or similar device, user control signals received via the network adaptor 218 are formatted into suitable mouse control signals by the control output module 214, and are transmitted to the personal computer causing the personal computer to operate in accordance with the received mouse input signals. Accordingly, user actuation of the user input device 164 causes a corresponding user input on the computing device 104 as if the user were operating a locally connected user input device, thereby allowing the client device 150 to remotely control the computing device 104 as if the user were locally operating the computing device 104.

For clarity, not all elements of the media encoder 120 are shown. For example, those skilled in the art will appreciate that the media encoder 120 may also comprise a storage device for storing configuration parameters, a power supply, etc.

In this way, by connecting the media encoder 120 to a personal computer and a suitable network enables a client device, such as a client device 150, to fully operate the personal computer from the client device. This thus enables a user of the client device to remotely use the functionality of the personal computer to, for example, browse the Internet, watch a movie, listen to music, and run applications such as word processing applications.

If it is desirable to limit the set of functionality which may be accessed from the client device an interaction manager application can be executed on the personal computer. Such an interaction manager can act as a portal through which all access to the personal computer is managed thereby enabling the computer owner to restrict access to certain applications or functions.

The storage device 126 accessible from the computing device 104 may be used for storing data related to the user interaction via the client device 150. In this way the user of the client device 150 can store files, Internet bookmarks, documents, etc, on the computing device 104.

Figure 3:
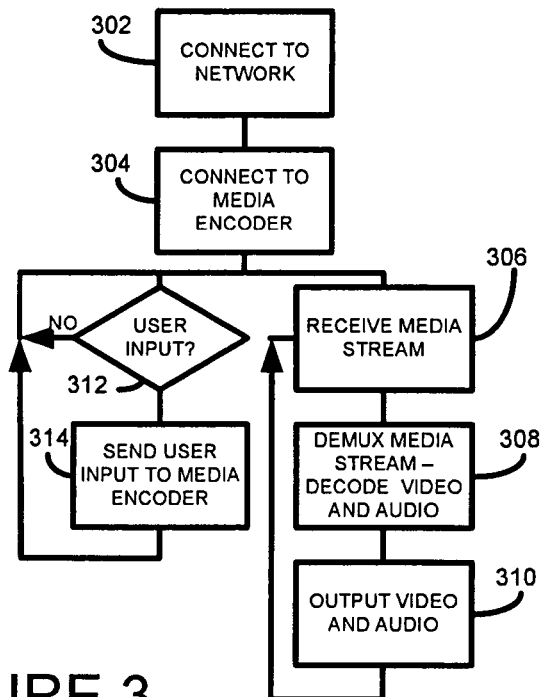
FIG. 3 is a flow diagram showing example processing steps taken by the client device 150 according to one embodiment of the present invention.
Figure 4:
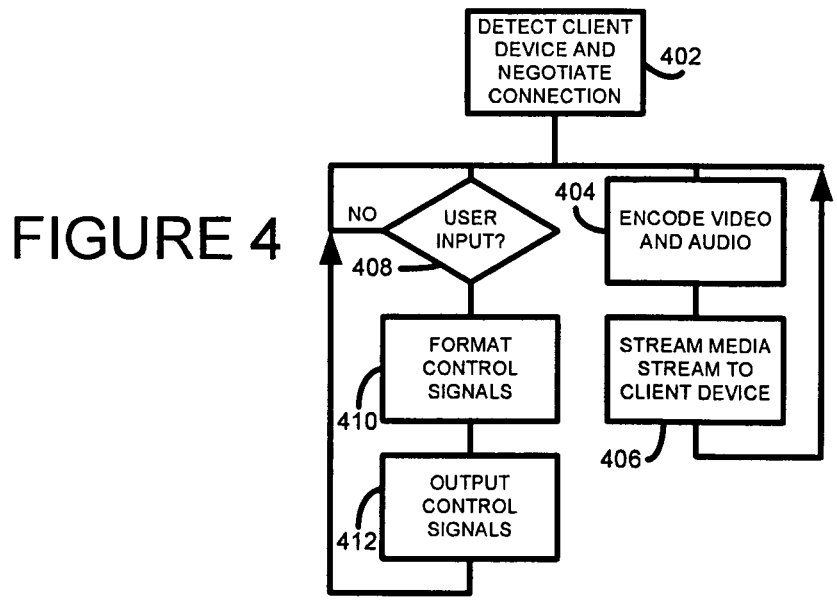
FIG. 4 is a flow diagram showing example processing steps taken by the media encoder 120 according to one embodiment of the present invention.

Example operational steps, according to one embodiment of the present invention, taken by both the client device 150 and the media encoder 120 will now be described with reference to FIGS. 3 and 4.

The media encoder 120 has an address, such as an IP address, which is known by the client device 150. This could be known, for example, either through the client device 150 being preconfigured with the address, or by providing the client device 150 with suitable means, such as the user input device 164, to enable the address to be entered into the device 150 by the user. When the client device 150 is switched on or is otherwise started, the client device 150 connects (step 302), through the network adaptor 152 to the network 102. Once connected to the network 102 the client device 150 connects to the media encoder 120 (step 304). Those skilled in the art will appreciate that the connection could be established in many different ways and using various protocols, such as session initiation protocol (SIP).

Prior to the media encoder 120 accepting the connection (step 402) to the client device 150 a negotiation phase may be entered, as provided for in SIP, for example, enabling details as to the type and capability of the client device 150 to be obtained by the media encoder 120. Any details obtained in this way may, for example, be used by the media encoder 120 to tailor the encoding of the video and audio to the capabilities of the client device 150. The control output module 214 could also be configured based on information obtained during the negotiation phase.

Once the connection is established the media encoder 120 encodes (step 404) any video and audio on the video and audio inputs 204 and 208 and streams the encoded video and audio as a media stream (step 406) to the client device 150.

The client device 150 receives the media stream (step 306), demultiplexes (step 308) the media stream into separate video and audio streams and decodes (step 308) the demultiplexed video and audio streams, and outputs the decoded video and audio streams (step 310) as appropriate.

The client device 150 detects (step 312) any user inputs made through the user input device 164 and sends (step 314) user control signals in a suitable format, over the network 102, to the media encoder 120.

When the media encoder 120 receives user control signals (step 408) it sends them to the control output module 214 which formats (step 410) the signals into appropriate output signals. For example, if the media encoder 120 is designed to be recognized as a mouse input device by the computing device 104 the received user input commands are preferably formatted into suitable mouse input commands. The formatted control signals are output (step 412) to the computing device via the control output 212.

The client device 150 is preferably a thin-client device which preferably comprises just sufficient processing capability and memory to be able to receive and decode the media stream 124 and to enable user inputs to be sent back to the computing device 104. Since the client device 150 only has to perform these limited tasks the device is low-cost, easy to use, low-maintenance and secure. Since the most processor intensive task performed by the client device 150 is the decoding of full frame video, there is only a need to provide processing capabilities which can handle such a task comfortably. Also, the client device 150 does not have to be significantly user configurable other than, for example, enabling the user to configure basic network settings such as the address of the computed device 104. Furthermore, the client device 150 does not need to allow the user to install additional software thereon, and only requires a processor and RAM sufficient to enable it to perform the above-mentioned tasks. The client device 150 may additionally include a storage device, such as a hard disk drive or other solid-state memory device to enable the storing of received content to be stored thereon and replayed later, for example when not connected to the network 102.

The media encoder 120 may be connected to any suitable device or devices, such as a personal computer, a television, DVD player, etc. The device can be an external stand-alone device, as shown in FIG. 1, but could equally be incorporated internally into a computing device.

In a further embodiment, the media encoder 120 enables a plurality of devices to be connected thereto, such as a personal computer, a television, a DVD player and so on. In this case the media encoder 120 may present to the client device 150, upon connection to the media encoder 120, a menu screen through which each of the different peripherals may be accessed. The menu screen may be presented to the user through a source selection controller (not shown).

The menu screen may be operated, for example, using a reserved set of user input commands issued from the client device 150 which indicate that the special user input commands are intended to control the media encoder 120 rather than being passed through to an externally connected device. For example, when a device connected to the media encoder 120 is selected the source selection controller selects the device from which video and audio signals are to be encoded and also selects the device to which received user input or control signals are to be sent.

In this way, for example, if a television is selected, the control output module 214 issues control signals which are able to control the television, for example, by emulating the control signals issued from an infra-red remote unit.

FIG. 5 is a block diagram showing an overview of a system according to one embodiment of the present invention, for example for use in a home environment. A home media centre 104 is used, for example, to store music, audio and video files, and a media encoder 120 is connected to the media centre 104 and to a local network 120. The media centre 104 is also connected to the Internet 122. The client device 150 is able to access the media centre 104 via a suitable wireless network 172, such as an 802.11 wireless LAN through a wireless hotspot 170. The client device is then able to wirelessly access any media file on the media centre 104, as well as being able to interact with any application on the media, including a suitable Internet browser to enable browsing of the Internet 122.

Referring back to the system of FIG. 1, if the remote computing device 104 is maintained by a commercial entity this enables the user of the client device 150 to access the computing device 104 in a simple and safe manner. For example, the commercial entity ensures the maintenance and security of the computing device, meaning that the user of the client device 150 is not required to perform any maintenance or updates on the computing device 104. In this way the user is required to have little or no IT knowledge and is able to access the remote server simply and safely. The user of the client device 150 is able to interact with the remote server through the client device 150 as if they were locally operating the remote server, for example in the manner described above.

In a yet further embodiment the user of the client device 150 may be charged for access to the remote server 104, for example, through a monthly subscription or by way of prepaid credit. In this way, a user can purchase a low-cost thin video-client device 150 and can subscribe to managed computing services provided by the remote server 104.

The invention claimed is:

1. Apparatus for accessing a remote source device, comprising:
    a network interface for receiving a media stream from a remote media encoding device, the remote media encoding device generating the media stream from media signals generated by the remote source device;
    a media decoder for decoding the received media stream; and
    a user input device for generating signals in response to actuation of the user input device and for transmitting the generated signals to the remote media encoding device via the network interface for delivery to the remote source device, wherein the remote media encoding device determines a type of the user input device and converts the generated signals into a format corresponding to the type of user input device,
    wherein the received media stream comprises multiplexed video and audio streams, and the media decoder further comprises a demultiplexer for demultiplexing the multiplexed video and audio streams.

2. The apparatus of claim 1, wherein the media decoder further comprises a video decoder and an audio decoder for generating a video and audio output based on the received media stream.

3. The apparatus of claim 1, the network interface being adapted to provide the remote media encoding device with details of technical characteristics of the apparatus, such technical characteristics including at least one of, video output capabilities, audio output capabilities, user input device characteristics and network characteristics.

4. The apparatus of claim 1, operable to enable a user of the apparatus to operate the remote source device as if they were locally operating that source device.

5. The apparatus of claim 1, wherein the user input device is adapted for transmitting the generated signals via the network interface.

6. The apparatus of claim 1, wherein the network interface is a packet-based network adapter.

7. A media encoding device comprising:
    a media encoder for generating a media stream by encoding media signals supplied by a source device,
        wherein the media signals comprise video and audio signals, and
        wherein the media encoder comprises a video encoder for encoding the video signals, an audio encoder for encoding the audio signals, and a multiplexer for multiplexing the encoded video and audio signals to generate the media stream;
    a network interface for transmitting the media stream to a remote device; and
    a control signal output module for receiving control signals from the remote device, and for transmitting the control signals via the network interface to the source device, wherein the control signal output module converts the received control signals into a format corresponding to a type of a user input device for the remote device.

8. A media encoding device according to claim 7, the network interface being arranged to obtain details of technical characteristics of the remote device, such technical characteristics including at least one of video output capabilities, audio output capabilities, user input device characteristics, network interface characteristics.

9. A media encoding device according to claim 7, operable to enable a remote device to operate the source device as if they were locally operating that source device.

10. A media encoding device according to claim 7, wherein the media encoder is adapted to detect the type of media signals to be encoded and to configure the media encoder to encode the media signals in accordance with the detected type.

11. A media encoding device according to claim 8, wherein the media encoder is adapted to encode the media signals based on the obtained technical characteristics of the remote device.

12. A media encoding device according to claim 7, the media encoding device being adapted to be connected to a plurality of source devices, the media encoding device further comprising a source selection controller for enabling the user of the remote device to select and access at least one of the plurality of source devices.

13. A media encoding device according to claim 7, wherein the network interface is adapted for transmitting the media stream via a packet-based network.

* * * * *